United States Patent [19]

Kirchner et al.

[11] Patent Number: 4,775,049

[45] Date of Patent: Oct. 4, 1988

[54] CONTAINER FOR GENERALLY FLAT ARTICLES

[75] Inventors: Balthasar Kirchner; Siegfried Schleicher, both of Eferding, Austria

[73] Assignee: Ernst Stadelmann Gesellschaft m.b.H., Bahnhofstrasse, Austria

[21] Appl. No.: 88,880

[22] Filed: Aug. 24, 1987

[30] Foreign Application Priority Data

Oct. 6, 1986 [EP] European Pat. Off. ........ 86890270.1

[51] Int. Cl.⁴ .......................................... B65D 85/672
[52] U.S. Cl. .................................... 206/449; 206/387; 220/20
[58] Field of Search ................ 206/387, 425, 444, 307, 206/309, 449; 220/20, 22.3

[56] References Cited

U.S. PATENT DOCUMENTS 4,627,535 12/1986 Kirchner et al. ............... 206/425 X
4,629,067 12/1986 Pavlik et al. .................... 206/444 X

FOREIGN PATENT DOCUMENTS 344416 7/1978 Austria ................................. 206/387
0023977 2/1981 European Pat. Off. ............ 206/387
2453842 5/1976 Fed. Rep. of Germany ...... 206/387

Primary Examiner—Jimmy G. Foster
Attorney, Agent, or Firm—Herbert Dubno

[57] ABSTRACT

A container for generally flat articles, such as magnetic tape cassettes, comprises a plurality of receptacles, which are arranged one behind the other and into which respective flat articles can slidably be inserted along pairs of tracks, which are provided on the inside surfaces of mutually opposite side walls. A support for a flat article is provided at the bottom of each receptacle. The tracks of each pair define a throat which defines an axis and comprises stops so that each flat article can be supported on one of said supports so as to be tiltable about said axis through an angle which is defined by said stops. In order to permit a proper accommodation of unpackaged and packaged flat articles, such as magnetic tape cassettes, the width of each throat is adapted to the thickness of one of said unit packages and the tracks are provided in their rear walls on a level between the supports and the throats with upwardly facing, re-entrant steps, which are adapted to support said packages at adjacent corners.

7 Claims, 1 Drawing Sheet

CONTAINER FOR GENERALLY FLAT ARTICLES

FIELD OF THE INVENTION

This invention relates to a container for generally flat articles, such as magnetic tape cassettes, which container comprises a plurality of receptacles, which are arranged one behind the other and into which respective flat articles can slidably be inserted along pairs of tracks, which are provided on the inside surfaces of mutually opposite side walls wherein a support for a flat article is provided at the bottom of each receptacle and the tracks of each pair define a throat which defines an axis and comprise stops so that each flat article can be supported on one of said supports so as to be tiltable about said axis through an angle which is defined by said stops.

BACKGROUND OF THE INVENTION

In order to ensure that magnetic tape cassettes having highly delicate magnetic tapes will be protected in storage, special containers of various types have been provided, which contain receptacles, which are arranged one behind the other and into which the cassettes can slidably be inserted. No. EP-A1-0 162 999 corresponding to U.S. Pat. No. 4,627,535 discloses a container in which each receptacle is defined by a pair of mutually opposite tracks. To permit the cassettes to be taken more conveniently from said receptacles, said tracks of each pair define a throat and stops so that the cassettes can be tilted in said receptacles and the cassettes which have been inserted into the receptacles can be handled like blocks of a block file and can be consecutively tilted for inspection. As a result, a desired cassette can easily be found and can conveniently be taken without damage. But the receptacles of that known container are designed to accommodate unpackaged cassettes and cannot be used to accommodate cassettes contained in a unit package. Some manufacturers of magnetic tape cassettes which are mainly intended for a storage of data recommend that the delicate recording media should be protected in that each cassette is left in the plastic box or in the simpler slide-in carton box in which the cassette is delivered until the cassette is inserted into the apparatus in which it is operated for recording or playback. For this reason the cassettes stored in suitable containers should also be kept in the plastic boxes or slide-in carton boxes. For that purpose, special containers are required, which are designed in adaptation to the dimensions of the unit package to be stored so that the manufacture of such containers is more expensive, storage containers of numerous different sizes must be offered for sale and must be kept in storage by the user and the magnetic tape librarian requires a plurality of different types of containers for the storage of unpackaged and packaged magnetic tape cassettes.

OBJECT OF THE INVENTION

It is an object of the invention to eliminate the disadvantages outlined hereinbefore and so to improve a container of the kind described first hereinbefore with structurally simple means that it can be used to accommodate unpackaged flat articles, such as magnetic tape cassettes, and such articles contained in unit packages and will have a capacity for the storage of a predetermined number of cassettes regardless of whether they are unpackaged or contained in unit packages. It is assumed that such unit packages are generally parallelepipedic and have a predetermined approximate length, a predetermined approximate width and a predetermined approximate thickness, which is smaller than said length and said width.

SUMMARY OF THE INVENTION

That object is accomplished in accordance with the invention in that the width of each throat is adapted to the thickness of said unit package and the tracks are provided in their rear walls on a level between the supports and the throats with upwardly facing, re-entrant steps, which are adapted to support said packages at adjacent corners. Said features will not involve high additional manufacturing costs and will ensure that one and the same container can be used to accommodate unpackaged cassettes and cassettes contained in unit packages. Unpackaged cassettes will still be tiltable on the other hand, cassettes in unit packages will be held in an upright position in the throats. Because the unit packages may be provided with inscriptions on their back edge face, it is not so important that packaged cassettes can be tilted. The unit packages will be supported on the steps, which are disposed above the supports, so that the unit packages can easily be taken from the receptacles. The re-entrant steps will permit not only a neat accommodation of the unit packages in the receptacles but will permit also a decrease of the spacing of the rear walls of the tracks extending between the steps and the bottom supports so that an excessive lateral play of the unpackaged cassettes in the receptacles will be avoided. On the other hand, the spacing of the rear walls of the tracks extending between the steps and the bottom supports so that an excessive lateral play of the unpackaged cassettes in the receptacles will be avoided. On the other hand, the spacing of the rear walls of the tracks extending between the steps and the bottom supports may be so large that cassette-containing slide-in carton boxes can be inserted into the receptacles past the steps as far as to the bottom supports and will then also be tiltable. In the resulting container, unpackaged cassettes and cassettes in slide-in carton boxes can be tiltably stored and cassette-containing plastic boxes can be non-tiltably stored. It will be understood that a given container may contain only unpackaged cassettes or only packaged cassettes or may contain both unpackaged cassettes as well as cassettes in packages of either of the kinds mentioned above.

The tracks may comprise blanks, which comprise vertical sections adjacent to throats and above and below the throats have sections which are inclined equal and opposite angles from the vertical, the cassettes will properly be stored and the cassettes will be handled easily and without a disturbance, whether or not the cassettes are contained in packages.

It will also be desirable to provide the tracks with guiding surfaces, which slope from the steps toward the supports, because such guiding surfaces will ensure that unpackaged cassettes or cassettes in slide-in carton boxes will not be caught by the steps as they are inserted past the throats and steps as far as to the supports.

SPECIFIC DESCRIPTION

Figure 2:
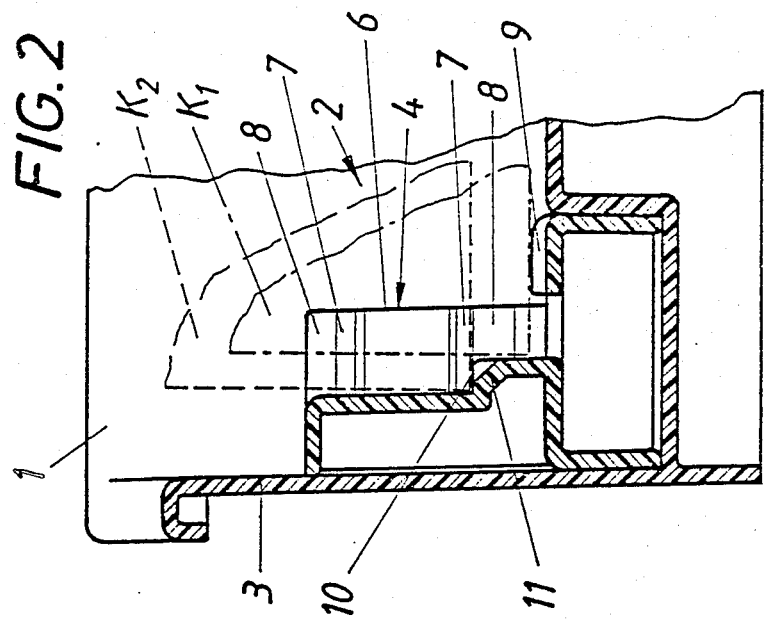
FIG. 2 is a transverse sectional view taken on line II—II in FIG. 1.
Figure 1:
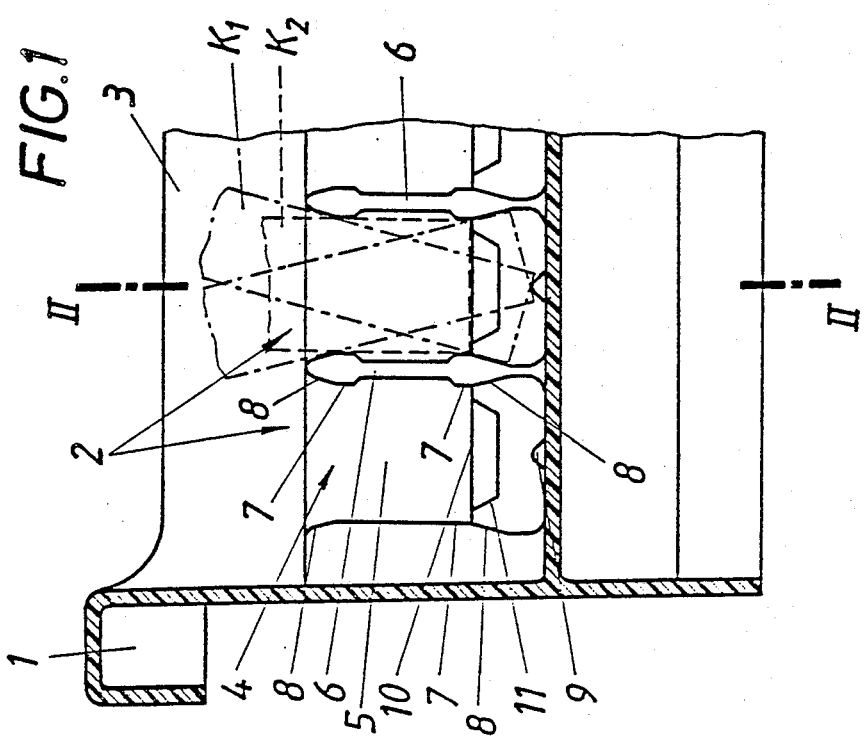
FIG. 1 is a fragmentary longitudinal sectional view showing a portion of a container in accordance with the invention.

A container 1 having a cover which is not shown defines a plurality of open-topped receptacles 2, which are aligned in the direction of their smallest dimension and serve to slidably receive packaged and/or unpackaged magnetic tape cassettes K1, K2. The container 1 comprises two mutually opposite side walls 3 and each receptacle 2 is defined by a pair of tracks 4, which are provided on the inside of respective side walls 3. Each pair of tracks 4 defines a throat 5, which has a substantial height and such a width that an unpackaged cassette K1 or a unit package K2, which consists of a plastic box and contains a cassette, can slidably be inserted through said throat. Each track 4 is defined by flanks 6, which comprise vertical sections 7 adjacent to the throat 5 and above and below the throat 5 comprise sloping sections 8, which are inclined at equal and opposite angles from the vertical. In the embodiment shown by way of example the vertical sections 7 are recessed from the throat 5, which in that case consists of two vertically spaced apart throat portions disposed above and below the vertical sections 7. That design is not essential and the throats 5 may be defined by the vertical sections 7.

Each throat has the same width at its top and bottom ends and the sloping sections 8 adjoin the top and bottom ends of the track 5 and constitute stops for defining the angle through which the unpackaged cassette K1 supported on the support 9 can be tilted about the axis defined by the throat 5.

Each receptacle 2 is provided at the center of its bottom with an upwardly protruding support 9 for supporting a cassette K1. Each track 4 is also formed in its rear surface with an upwardly facing, setback step 10, which is disposed on a level between the throat 5 and the support 9 and is adapted to support a plastic box K2 at the adjacent corner. Each step 10 is adjoined by a guiding surface 11, which slopes toward the adjacent support 9.

The receptacles 2 of the container 1 are adapted to accommodate unpackaged cassettes K1 and cassettes which are packaged in plastic boxes K2. An unpackaged cassette K1 which has been inserted into a receptacle 2 will be supported on the support 9 and will be tiltable in the tracks 4 about an axis which is defined by the throat 5 and through an angle which is defined by the sloping sections 8 of the flanks 6 of the tracks. Owing to their tiltable mounting, the unpackaged cassettes K1 can be inspected in the receptacles like elements of a file so that a given cassette can easily be found in the container 1 or can easily be inserted into the appropriate receptacle 2. If the tracks provide an adequate play for the unpackaged cassettes K1, even cassettes in thin packages, such as slide-in carton boxes, can be handled like unpackaged cassettes.

On the other hand, a unit package K2 consisting of a plastic box which contains a cassette must be inserted into a receptacle 2 in a vertical direction and will then rest on the steps 10 and will be frictionally held by the throat-defining portions of the cheeks 6 on opposite sides of the vertical sections 7.

The receptacles 2 of the container 1 in accordance with the invention can accommodate unpackaged cassettes K1 and cassettes in rigid unit packages K2 in a number which will be independent of the use of packaged or unpackaged cassettes.

The invention has been described hereinbefore and is illustrated on the drawing with reference to a container for magnetic tape cassettes. It will be understood that the teachings of the invention will also be applicable to advantage to containers for other flat articles without a package or in a parallelepipedic unit package, which has a predetermined approximate length, a predetermined approximate width and a predetermined approximate thickness, which is smaller than said length and said width, if the container is so designed that the unpackaged articles are tiltably held in the container so that they can easily be inspected.

We claim:

1. A container for accommodating generally flat, unpackaged articles of a given length and width, which are adapted to be packaged in generally parallelepipedic unit packages having a predetermined approximate length, a predetermined approximate width, which is larger than said given length and width, said container comprising:

two side walls, each of which is provided on its inside surfaces with a plurality of tracks, which are spaced apart along said side wall and together with respective tracks on the other side wall define a plurality of open-topped receptacles, each of which has on an intermediate level of the height of each receptacle a throat, which defines an axis by confining a respective article for pivotal movement about said axis, means forming at a bottom of each of said receptacles a support spaced below said throat, each of said receptacles is adapted to accommodate one of said unpackaged articles so that said flat article is slidably supported on said support and tiltable about said axis, means on said tracks forming stops for limiting the angle through which said flat article supported on said support is tiltable about said axis, each of said throats having a width which is so adapted to a thickness of said unit packages that said unit package is adapted to be inserted through said throat from above; and means on the two tracks defining each of said receptacles forming on a predetermined level between said support and said throat respective, upwardly facing setback steps, which are adapted to support one of said unit packages and between which are unpackaged article can be inserted to engage said support.

2. The container defined in claim 1 wherein each of said tracks is defined by two flanks, each of which includes
   a vertical section adjacent to said throat and
   two sloping sections, which extend above and below said throat and are inclined at equal and opposite angles from the vertical.

3. The container defined in claim 2 wherein
   each of said throats has a substantial height and
   each of said vertical sections extends between the top and bottom levels of the adjacent throat.

4. The improvement set forth in claim 1, wherein each of said tracks has a rear wall that is formed with a guiding surface, which adjoins said step and slopes from said step toward said support.

5. The container defined in claim 1 configured to receive magnetic tape cassettes constituting said articles.

6. The container defined in claim 1, wherein each of said throats has top and bottom ends and has the same width at said top and bottom ends.

7. The container defined in claim 1, wherein said stops adjoin said throats at said top and bottom ends.

* * * * *